United States Patent [19]

Forkner

[11] 4,282,258
[45] Aug. 4, 1981

[54] METHOD AND APPARATUS FOR THE MANUFACTURE OF FORMED EDIBLE PRODUCTS AND PRODUCTS RESULTING THEREFROM

[76] Inventor: John H. Forkner, 2116 Mayfair Dr. West, Fresno, Calif. 94118

[21] Appl. No.: 63,821

[22] Filed: Aug. 6, 1979

Related U.S. Application Data

[63] Continuation-in-part of Ser. No. 892,670, Apr. 3, 1978, abandoned.

[51] Int. Cl.³ .............................................. A23L 1/04
[52] U.S. Cl. .................................. 426/100; 426/102; 426/104; 426/143; 426/274; 426/615; 426/303; 426/389; 426/438; 426/512; 426/514; 425/261; 425/279; 425/282; 425/276; 425/362; 425/405 R; 425/404; 249/57
[58] Field of Search ................ 426/102, 104, 575, 577, 426/514, 615, 303, 804, 438, 578, 517, 512, 100, 143, 274, 389; 425/388, DIG. 201, 257, 279, 261, 276, 444, 282, 437, 290, 453, 362, 405 R, 404; 249/57

[56] References Cited

U.S. PATENT DOCUMENTS

| | | | |
|---|---|---|---|
| 1,566,666 | 12/1925 | Frost et al. | 425/388 |
| 2,779,097 | 1/1957 | Frazier | 425/290 |
| 2,931,064 | 4/1960 | Matoba | 425/388 |
| 2,992,925 | 7/1961 | Green et al. | 426/102 |
| 3,427,801 | 2/1969 | McLeish | 249/57 |
| 3,488,411 | 1/1970 | Goldman | 425/453 |
| 3,530,537 | 9/1970 | Walker | 425/388 |
| 3,650,766 | 3/1972 | Smadar | 426/292 |
| 3,676,158 | 7/1972 | Fischer et al. | 426/303 |
| 3,686,002 | 8/1972 | Nakano | 426/274 |
| 3,703,572 | 11/1972 | Bellasalma | 425/388 |
| 4,126,704 | 11/1978 | McCarthy et al. | 426/512 |

Primary Examiner—S. Leon Bashore
Assistant Examiner—Michael L. Goldman
Attorney, Agent, or Firm—Flehr, Hohbach, Test, Albritton & Herbert

[57] ABSTRACT

A method for the manufacture of formed edible products from moist edible pieces. Pneumatic suction draws the pieces into a mold or die cavity. A binder such as a gel solution is applied to the pieces in the cavity to cause adherence between the pieces. Thereafter contact with a chilled surface serves to attach the formed mass to the surface. The die is then withdrawn, leaving the form attached to the chilled surface. The preferred source material is onion pieces, with the method being carried out to produce onion rings. Also apparatus for carrying out the method and products resulting therefrom.

33 Claims, 13 Drawing Figures

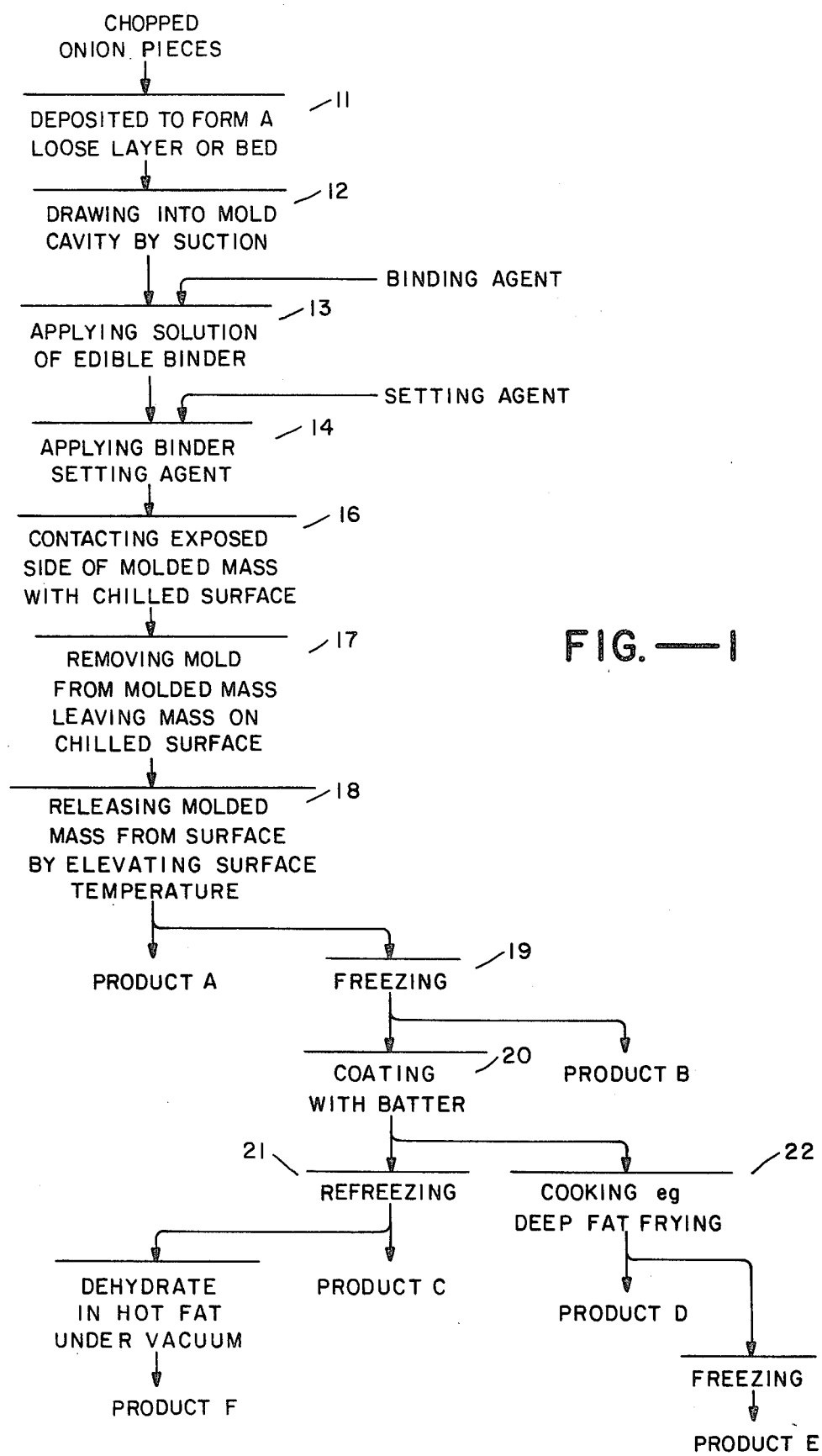

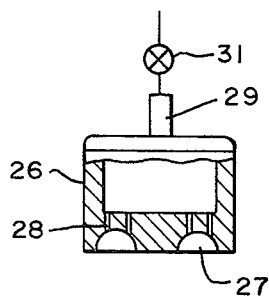
FIG.—2
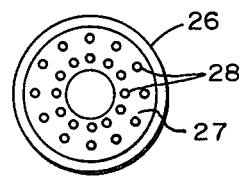
FIG.—3
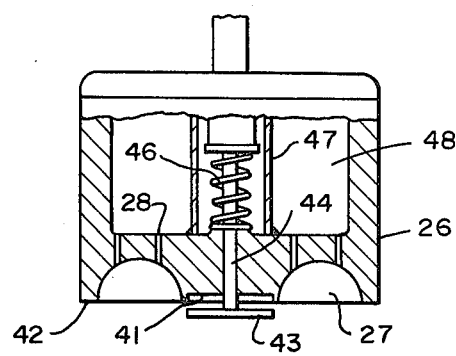
FIG.—9
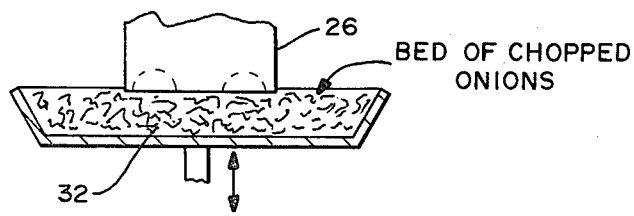
FIG.—4
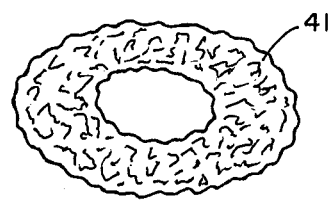
FIG.—10
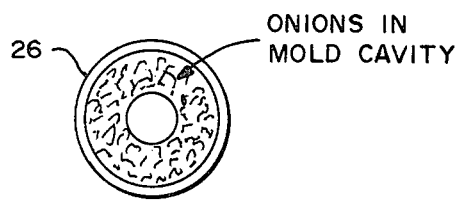
FIG.—5
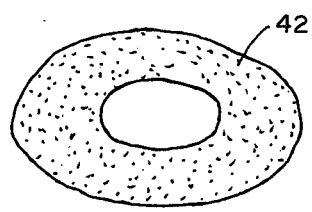
FIG.—11
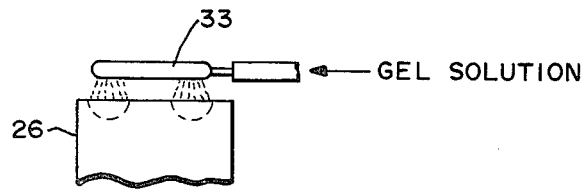
FIG.—6
FIG.—13
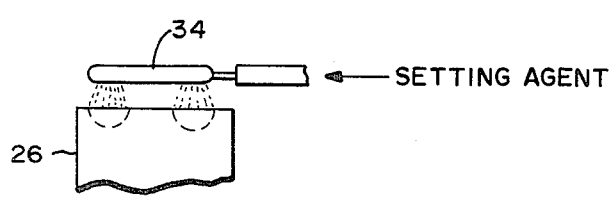
FIG.—7
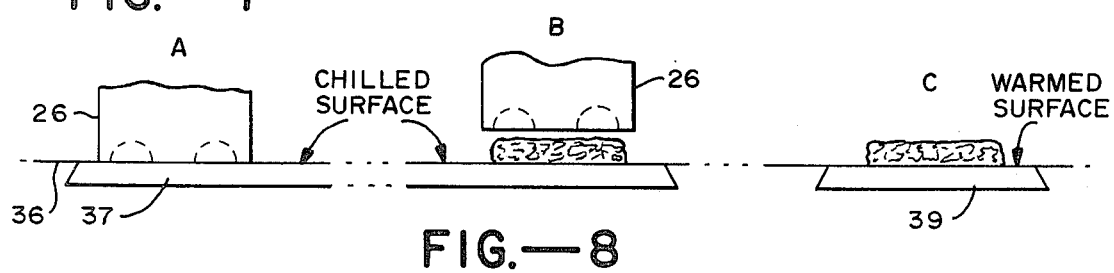
FIG.—8

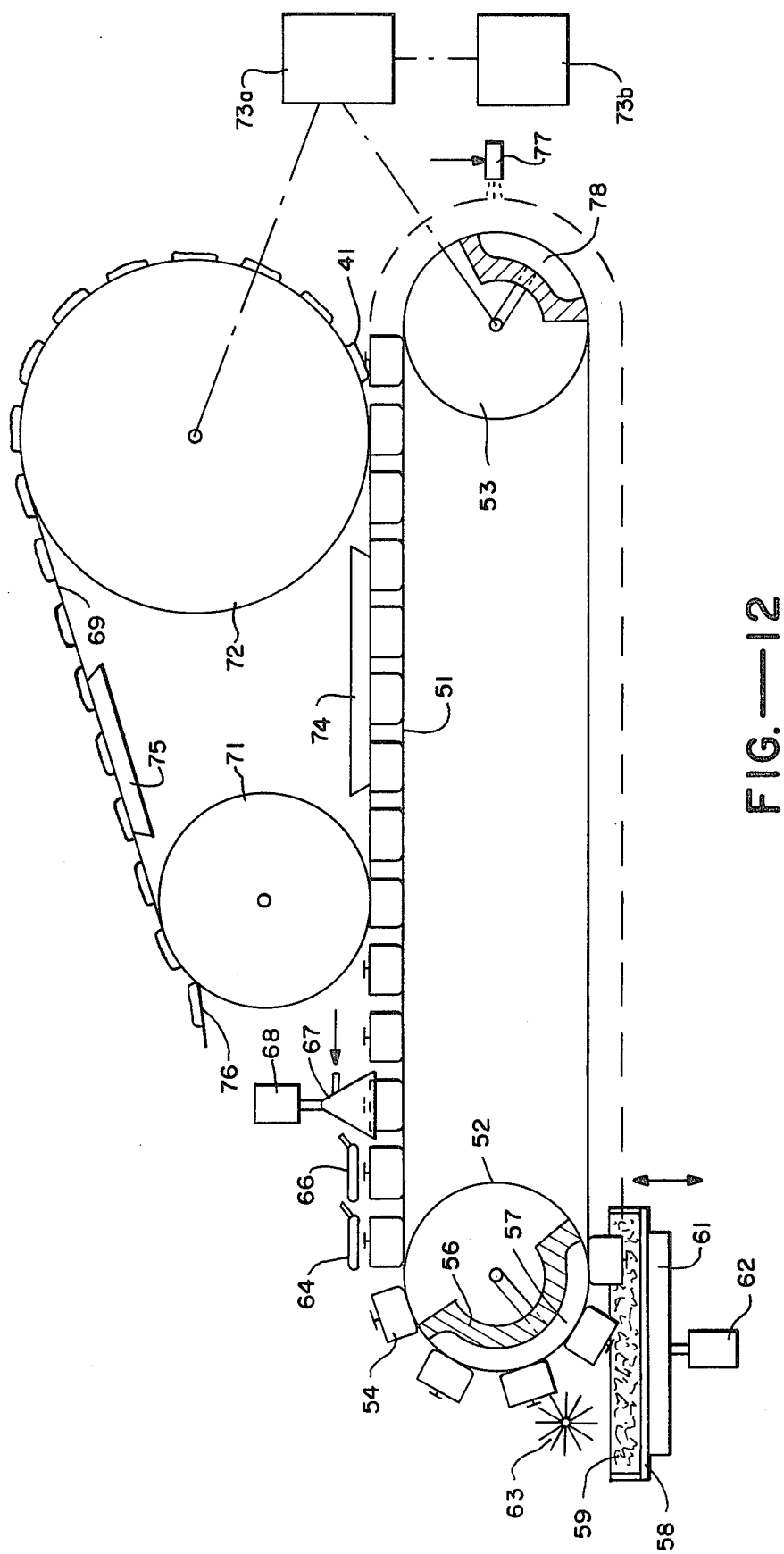
FIG.—12

METHOD AND APPARATUS FOR THE MANUFACTURE OF FORMED EDIBLE PRODUCTS AND PRODUCTS RESULTING THEREFROM

CROSS-REFERENCE TO RELATED APPLICATION

This application is a continuation-in-part of my application Ser. No. 892,670 filed Apr. 3, 1978, now abandoned.

BACKGROUND OF THE INVENTION

This invention relates generally to methods and apparatus for the manufacture of formed edible products, and marketable products resulting from such methods.

Various edible products have been made from particulate moist food materials which are shaped to a desired form and then cooked as by deep fat frying. One such product is known as onion rings. One manufacturing method employed involves forming a paste containing uncooked particulate onion, and depositing the paste as rings of the desired size. The paste generally incorporates one or more gums or gel forming agents dispersed in water and may contain other edible solids. The deposited forms are generally coated with a batter and breading and then deep fat fried. They may then be frozen and packaged for marketing. Such an onion ring product is frequently used in place of the more common fried onion rings made from the natural rings of onion. The flavor and eating properties of such products are quite different from natural rings due to the necessarily fine subdivision of the onion which alters its natural character and mouth feel. The mass of matrix dominates the structure and imparts a gel paste character of markedly different eating properties than the natural ring.

OBJECTS OF THE INVENTION AND SUMMARY

In general, it is an object of the present invention to provide a method for the manufacture of onion rings and other formed edible products, which avoids the difficulties referred to above, and which results in high quality products having good flavor characteristics and an attractive appearance.

Another object is to provide a method which makes possible the use of edible pieces (e.g., onion) of substantial size which form the bulk of the solids of the final product and which provide a distinctive appearance to the final product.

Another object is to provide adequate bonding of the edible pieces together whereby after removal of a form from a die cavity, it has sufficient strength for subsequent processing and for handling and packaging.

Another object is to provide a processed onion ring product suitable for consumer marketing which is superior to other processed onion rings with respect to eating properties and attractive appearance.

In general, the present method makes use of source material in the form of edible pieces of substantial size, and these pieces are drawn into a die cavity by pneumatic suction while applying the die to the surface of a bed of the material. The forming die is then removed from the bed of material while continuing to apply suction, and material is applied to cause binding of the pieces to each other. Application of suction to the cavity is discontinued preferably before application of the binding agent. Thereafter the open side of the die cavity is applied to a chilled surface that it at a temperature such as to cause the moist material which comes into contact with the chilled surface to adhere thereto. Subsequently the die is removed from the chilled surface, with the molded form retained within the cavity. The temperature of the surface is then elevated to effect removal of the molded form for further processing. Preferably the binding agent consists of both a gel solution and a solution that promotes rapid setting or hardening of the gel. The preferred source material is uncooked onion pieces. Also it is preferable to employ onion pieces that are segments of natural onion rings taken from slices of onion bulbs. The invention also includes apparatus for carrying out the method and products resulting therefrom.

Additional features of the invention will appear from the following description in which the preferred embodiments have been set forth in detail in conjunction with the accompanying drawing.

BRIEF DESCRIPTION OF THE DRAWING

FIG. 1 is a flow diagram illustrating the method of the present invention.

FIG. 2 is a side elevational view partly in section showing one form of die for carrying out the method.

FIG. 3 is a bottom plan view of the mold shown in FIG. 2.

FIG. 4 illustrates application of the mold to a bed of material, in this instance chopped onions.

FIG. 5 illustrates the mold cavity with onion pieces being held within the cavity by pneumatic suction.

FIG. 6 illustrates application of a binding agent solution to the material within the mold cavity.

FIG. 7 illustrates a setting agent being applied to the material in the mold cavity.

FIG. 8 illustrates the steps in which the mold cavity with material therein is applied to a chilled surface, the mold removed and the molded material (e.g., chopped onions) released from the chilled surface.

FIG. 9 is a side elevation partly in section showing another die embodiment.

FIG. 10 is a perspective view illustrating the product before coating with a batter.

FIG. 11 shows the product of FIG. 10 after coating with a batter.

FIG. 12 schematically shows apparatus for automating the steps described above.

FIG. 13 shows the product of FIG. 10 part of which is coated with a batter and part of which is not.

DESCRIPTION OF THE PREFERRED EMBODIMENTS

The flow diagram FIG. 1 makes specific reference to manufacture of products in the form of onion rings, although as presently explained, the method is deemed to be applicable to other physical forms and other types of moist edible materials. The source material indicated in FIG. 1 is elongated chopped onion pieces obtained by application of a dicing or chopping machine to fresh harvested onions of the bulbulus type. Preferably the pieces are formed as segments of natural onion rings, for reasons to be presently explained. Thus onion bulbs can be sliced transversely of the bulb axis to provide slices of suitable thickness (e.g., ⅛ to 5/16 inch) which readily separate into natural rings having a radial thickness of from ⅛ to 5/16 inches, which then can be divided circumferentially to desired lengths (e.g., 3/16 to ⅜ inch).

The pieces may be fresh, partially dehydrated or rehydrated after drying. It is assumed that the moisture content of these pieces will not be less than about 75% and may range from 75 to 90%. However, the pieces may be partially dried, or dried pieces that have been rehydrated. The pieces may vary in size, depending upon the size of the die cavity and the product desired. Particularly they are of such size that when deposited as a mass without substantial compaction in step 11, there is a substantial amount of interstitial space between the pieces, and the mass is pervious to passage of air. In step 12 pieces from the bed are drawn by pneumatic suction into a mold cavity. Within the mold cavity the interstices between the pieces afford sufficient flow resistance to passage of air to retain the pieces within the cavity while the cavity is being evacuated. In step 13 an edible binder is applied to the molded mass. The binder is added as a water solution and may be sprayed or otherwise dispersed over the surfaces of the pieces, preferably after suction has been discontinued. Step 14 shows application of a setting solution after application of the binding solution. Here again the setting agent can be sprayed or otherwise applied to the surfaces of the pieces in the form of a solution. As will be presently explained, in some instances a single solution may be applied in one step. Also the setting solution may be applied before the gel solution, or to the pieces before they are drawn into the die cavity. The binding solution preferably is of such viscosity that a substantial amount remains on the upper surface of the molded form, with the remainder sinking into interstices of the mass. In step 16 the exposed side of the molded mass within the die cavity is contacted with a chilled surface which is at a lower temperature level. This serves to cause portions of these pieces and the associated gel solution which are at or near the earea of interface contact with the chilled surface to be chilled and bonded or caused to adhere to the surface. In step 17 the mold is removed from the chilled surface and molded mass, leaving the mass adhered to the surface. Thereafter in step 18 the molded mass is released by elevating the surface temperature. Then the separated form may be processed as by chilling or freezing.

The Product A resulting from step 18 consists of an uncooked mass of onion pieces which has spaces between the pieces largely filled with gel and which has the form of the mold cavity from which it was removed. Such a product can be stored under refrigeration for a substantial period before further processing. As indicated at 19, the product may be frozen to produce the frozen Product B, and may be stored in frozen condition for a indefinite period before marketing or further processing. Generally, and assuming that the material is onion pieces, further processing will consist of coating the frozen mass with a suitable batter as indicated in step 20, the batter being one of the type commonly used in connection with deep fat frying. By way of example, the batter may consist mainly of a cereal flour mixed with milk and egg. After being coated with the batter and breaded (i.e., application of dry bread crumbs), the product may be refrozen at 21 to produce the frozen Product C. This product may likewise be stored indefinitely pending marketing or further processing, which generally consists of deep fat frying. The coated product from step 20 may be immediately subjected to deep fat cooking in step 22 to produce the Product D, which is ready to be consumed. In some instances, after deep fat cooking in step 22 the product may be frozen and marketed as a frozen product. Such a product is ready to be eaten after it has been thawed and warmed in an oven.

As will be presently described, it is desirable to control batter coating whereby a substantial part of the mass is left uncoated.

Water solutions of various gums and gels can be used as binding agents. Particularly reference can be made to the more common edible gums and gel forming materials used in food formulations, such as gum arabic, agar, locust bean gum, xanthan, carageenan, gelatin, pectin, alginates, and gelatinized starch. Preferably the agent selected is one which can be set rapidly by contact with a suitable setting agent. Particular reference can be made to low methoxyl pectin (e.g., Exchange Citrus Pectin No. 3477) which sets rapidly upon contact with a solution containing divalent metal salt (e.g., calcium chloride) and to certain alginates (e.g., Keltone sold by Kelco Company) which are likewise sensitive to calcium ion. The binding agent can be applied as an aqueous solution, and the setting agent can likewise be an aqueous solution of a salt like calcium chloride. It is known that low methoxyl pectin provides more viscous gels when their solutions are slightly acid (e.g., pH 3) and contain sugar (e.g., sucrose, corn sugar, etc.). Thus a solution of this material may include a suitable organic acid or acid salt (e.g., citric acid, etc.) and sugar (e.g., sucrose, glucose, etc.).

FIGS. 2 and 3 schematically illustrate a simple die having an annular mold cavity and intended for use in the manufacture of onion rings. One end of the body 26 has an annular cavity 27 which is in communication with the interior of the body through ducts 28. A suitable suction pump is connected with the interior of the body through pipe 29 which is shown provided with the valve 31. Assuming that suction is being applied to the mold cavity 27 when the mold is contacted with the surface of a loose bed of onion pieces, pieces in proximity with the cavity are drawn by pneumatic suction into the cavity to fill the same with a volume such that some pieces protrude from the open side of the cavity. Thus as schematically illustrated in FIG. 4, the lower end of the die is in contact with the upper surface of the bed 32 of onion pieces, whereby the onion pieces in proximity with the die cavity are drawn into the same. Some force can be applied to urge the die against the bed to promote effective and complete filling of the cavity. Upon removing the die from contact with the bed 32, the cavity remains filled with the pieces as illustrated in FIG. 5, assuming that the suction is continued. Excess pieces of onion can be removed at this time as by brushing over the face of the die. FIGS. 6 and 7 represent application of a viscous binding and a setting solution, when both such solutions are used. In FIG. 6 the mold cavity is arranged to face upwardly and the binding solution is shown being applied as a stream or spray from the spray head 33, preferably after suction has been discontinued. A single nozzle or more than one such nozzle may be used in place of the spray head illustrated, with the nozzle being traversed over the onion pieces to obtain effective distribution of the solution. A ring-shaped spray head 34 is also shown in FIG. 7 for applying the setting solution. Some of the solutions settle into interstices and over the surfaces of the pieces.

After application of the binding and setting solutions, initial setting of the gel proceeds rapidly, with the result that the pieces of onion are bonded together at their points of mutual contact. Also assuming that the binding solution when applied has a preferred viscosity, a substantial amount remains on the upper side of the mass whereby after the gel becomes non-flowing there is a gel ring on the upper side which lends structural strength to the ring and aids in subsequent attachment to a chilled surface.

During the above described steps and preferably after applying the binding solution, some air or other gas under pressure can be applied to the exterior side and through the molded form to more effectively press the pieces into the cavity and cause better penetration of the binding solution into the interstices of the mass. This can be carried out by applying the die to a cup or bell to which gas under pressure is supplied. Also with or without such application of air under pressure, the die may be vibrated or jolted vertically to promote downward penetration of the binding solution and interaction between the binding and setting solutions.

Removal of the molded mass from the die cavity can be carried out as follows: A member 36 (FIG. 8) is provided which has a heat transfer surface and good heat conductivity. For example, it may be a thin metal sheet or the thin metal band of a conveyer. A portion of the sheet is chilled as by contact with the refrigerated plate 37, and the die is placed upon the chilled surface in the manner shown in FIG. 8 (Station A). This brings one side of the molded mass into intimate contact with the chilled surface with the result that the portions of the pieces and gel solution contacting the surface are chilled, thus causing the mass as a whole to adhere to the surface. Thereafter the die may be removed from the molded mass at Station B as illustrated in FIG. 8, leaving the mass intact but adhered to the surface. The chilling before removal is to a temperature and for a time period sufficient to somewhat lower the temperature of the main volume of the mass to cause setting and hardening of the gel without causing bonding to the adjacent surfaces of the die cavity, while at the same time it causes adherence of the molded form to the chilled surface in the area of interface contact. Preferably the chilled surface is below 32° F. to cause some freezing in the interface area. Subsequently the surface is warmed as by suitable heating means 39, thereby elevating its temperature at the interface area to release the molded mass. Thereafter the molded mass may be readily removed from the supporting surface. The surface is practice may be a metal belt which moves step by step from Station A to Station C.

The steps described in connection with FIGS. 3-8 are those designated as steps 12-18 of FIG. 1. The resulting product without further processing is illustrated in FIG. 10. It has a ring-shaped mass 41 which may have some porosity due to interstices between the pieces that are not filled with gel. The onion pieces have retained their characteristics identity and are clearly visible as natural onion pieces. Assuming that the ring as shown in FIG. 10 is frozen and dipped in batter, it may appear as shown in FIG. 11. As will be presently explained, it is preferable to so control application of batter as to leave a substantial area of the onion mass uncoated and exposed.

In the foregoing reference is made to the use of both a gel solution and a setting solution, the gel solution being sensitive to calcium ion. Instead of employing the two solutions in succession, it is possible to apply a freshly mixed gel solution (e.g., low methoxyl pectin) containing a salt like calcium chloride and apply the same to the material in the mold cavity before substantial setting has occurred. When applied to a chilled surface as schematically illustrated in Station A of FIG. 8, the portions of the onion pieces which have been coated with the solution and which together with the bonding solution are in interface contact with the chilled surface are caused to adhere to the surface as by freezing and accelerated setting of the gel due to the lower temperature, while the remaining mass of the rings is cooled to a temperature and for a sufficient period of time to cause setting and hardening of the gel. As previously mentioned, preferably, and particularly when using a gel or gum solution without use of a setting agent, the surface 36 can be at a temperature below freezing point whereby adherence of the molded mass to the chilled surface occurs by freezing of the portions of the onion and gel solution in the interface contact area which are reduced below freezing temperature by such contact, as well as by accelerated hardening of the gel in the portions of the mass remote from the interface area which occurs by virtue of being chilled to a lower temperature level short of freezing.

As described with reference to FIG. 8, the surface 36 is made of thin sheet metal which is assumed to be impervious. The surface of the metal can be textured as by etching or light sand blasting to promote adherence. However, it is possible to employ a fine mesh metal or plastic screen or cloth woven with metal or synthetic (e.g., Nylon) filaments. Screening or cloth provide texturized surfaces that increase the contact area and promote effective adherence.

Assuming the use of onion pieces in carrying out the method, it has been observed that some pieces tend to bridge over the central end surface of the mold, thus interfering with ready removal of the die as indicated in Station B. To prevent this difficulty, the die construction shown in FIG. 9 can be employed. In this instance the body 26 and the mold cavity 27 are the same as in FIG. 2, but the central end surface 41 is inset from the plane of edge 42 and is adapted to accommodate the disk 43. This disk can be made of suitable material, such as a plastic like Nylon, and is mounted upon the stem 44. Its diameter is about the same as the diameter of the surface 41. The disk is normally urged to the projected position shown in FIG. 9 by the compession spring 36. A shield 47 preferably surrounds the inner portion of the stem 44 and spring 46 and provides a seal that prevents any sucking of air past the disk and stem. When this die is pressed against an onion bed as shown in FIG. 4 and suction applied to space 48, the disk is retracted against the surfaces 41 by the force with which the disk is pressed against the bed. However, when the die is removed from the bed the disk 43 assumes its projected position as shown in FIG. 9. In this position excess clinging pieces of onion can be readily brushed away. When applied against the chilled member 36 as shown in Station A of FIG. 8, the disk 43 again assumes its retracted position whereby the molded form can be pressed against the chilled surface. The construction just described tends to prevent pieces of the onion material being lodged between the center of the die cavity and the surface of member 36, thereby ensuring contact of the peripheral surface 43 with the surface of member 36, and preventing an accumulation or bridging over of material upon the central surface 41. Any material which remains upon the face of the disk 43 when the die is removed from the onion bed 32 and the disk is in its projected position as in FIG. 4, can be readily brushed off whereby it does not interfere with subsequent application to the chilled member 36.

It will be evident that the die can be constructed to provide formed masses of various configurations, including for example, bars or sticks, wafers, cubes or other shapes. As examples of moist materials which can be used other than moist onion pieces, reference can be made to such moist materials as freshly cooked corn niblets, fresh or cooked blueberries, and dried fruits or dried fruit fragments, such as raisins and currants. Also small moist pieces of edible meats can be employed, such as pieces of shrimp, fish, fowl and meat or mincemeat. The size of the pieces may vary depending upon their character and the dimensions of the die cavity. They should be of sufficient size and firmness to be relatively free flowing and to enable transfer into the die cavity by suction without mushing or breaking to form a molded mass having interstices between the pieces. Their major dimension should be compatible with accommodation within the cavity, and their physical form and consistency or firmness should be such that with some compaction within the cavity interstices are provided between the pieces which accommodate penetration of the binding agent.

The onion ring shown in FIG. 11 has a batter coating completely surrounding the onion pieces. A more desirable construction is shown in FIG. 13. In this instance the coating or enrobing operation is controlled whereby it is applied only to the inner and outer sides and lower surface of the ring, leaving the onion pieces exposed on the upper surface. This provides a novel ring that is attractive in appearance and has good eating properties. The uncoated pieces immediately impart a strong onion flavor when eaten. Deep fat frying of such rings leaves the coating intact. Direct contact of the hot fat with the exposed onion pieces may cause some browning which enhances the flavor.

FIG. 12 schematically shows apparatus which can be used to automate the method. It consists of an endless belt 51 which can be made of sheet metal (e.g., stainless steel) and which is carried by the rotatable drums 52 and 53. The dies 54 are secured to the belt 51 and can be constructed as shown in FIG. 9. The portions of the belt to which the dies are attached are provided with openings which permit communication with the interior of the dies for application of suction. The drum 52 is associated with an interior valve means 56, the cavity 57 of which is connected to evacuating means and is in communication with the dies for a portion of their movement about the drum.

Means is provided below the drum 52 for presenting onion pieces or other material to the dies. As schematically illustrated, this consists of a cross-conveyer belt 58 which serves to carry the bed or layer 59 of onion pieces. The belt 51 is driven incrementally, or in other words, step by step, in accordance with the spacing between the dies. During each dwell or pause of the conveyer, that portion of the belt 58 below the drum 52 is elevated by suitable means such as the plate 61 carried by the cyclically operated elevating means 62, to press the bed of onion pieces against the die immediately overlying the same. Before the end of the dwell the belt 58 is lowered sufficiently far to facilitate further movement of the die into which the material has been transferred. As the die progresses step by step around the drum 52, excess onion pieces are removed by the rotating brush 63.

When each die reaches a position above the axis of the drum 52, suction has been discontinued and a measured amount of binding or gel forming solution is applied to the material in the die cavity by the solution depositing head or nozzle 64. The solution is supplied to the head 64 by suitable metering means which is synchronized with the step-by-step movement of the belt 51. When the die is further advanced after introducing the binding solution, a measured amount of setting solution can be applied by the nozzle 66. In a further position a cup 67 may be lowered upon the die by the cyclic lowering and raising means 68, and air under pressure momentarily applied to the material within the die cavity.

A second endless belt 69 which may be made of sheet metal is carried by the drums 71 and 72. It is driven in synchronism with the belt 51 as schematically indicated by gearing and motor 73a and 73b. Drum 72 is maintained at a relatively low temperature by suitable refrigerating means. The lower run of the belt 69 is shown in thermal contact with a refrigerated pad 74. The upper run of the conveyer is shown passing over a pad 75 which is heated for the purpose of elevating the temperature of that portion of the belt in contact with the same.

When a die advances to a position where its end surface is engaged by the lower run of the belt 69, its disk 43 is retracted and the face of the die and the exposed material within the die recess are pressed into direct contact with the chilled belt surface. By the time a die has progressed from drum 71 to the drum 72, the material within the die recess has become effectively attached to the belt surface, whereby when a die recedes from the chilled belt surface the formed onion mass 41 is withdrawn from the die as illustrated near the right hand end of FIG. 12 and proceeds about the drum 72. When the formed mass reaches the region of the heating pad 75, the portion of the belt 69 to which it has been attached is heated to an elevated temperature sufficient to free the formed mass 41 from the belt, and thereafter the freed mass is discharged over the scalping blade 76.

It will be evident that the apparatus just described may be controlled and operated in such a manner that the portion of the belt 59 which first engages the dies is at a temperature below freezing point, thereby causing effective adherence of the onion forms to the belt by freezing. Also it will be understood that the dies can vary in construction and the cavities can be made to provide various products of the desired size and configuration.

As explained in connection with FIGS. 4–8, the belt 69 may have a texturized surface to promote adherence of the molded masses. Also adherence can be promoted by applying some moisture to the belt surface before contact with the dies, as for example, by applying moisture or an aqueous solution (i.e., dilute calcium chloride solution) in the form of atomized particles.

As explained in connection with FIGS. 4–8, the belt 69 may have a texturized surface to promote adherence of the molded masses. Also adherence can be promoted by applying some moisture to the belt surface before contact with the dies, as for example, by applying moisture or an aqueous solution (i.e., dilute calcium chloride solution) in the form of atomized particles. In the region of the drum washing may be applied to the die cavities. Thus one or more spray nozzles 77 may apply washing liquid. Also, air pressure or liquid can be applied through the back side of the dies as controlled by the valve means 78, thus removing any remaining pieces, gel material or onion juices from the cavities by discharging them outwardly from the openings 28 and the die cavities.

Previous reference has been made to subdividing onions in such a manner that the bulk of the pieces have at least two side surfaces which correspond to the natural skin-like surfaces of an onion ring. Stated another way, the two side skin-like surfaces correspond to the regions of demarcation between the natural enveloping layers of the onion bulb. Thus the thickness as measured between these surfaces is not less and usually the same as the thickness of the natural enveloping bulb layer from which the piece was derived. As is well known, when an onion bulb is sliced perpendicular to its axis, the resulting slice consists of a plurality of concentric rings that are weakly bonded together. When a natural ring is separated from a slice and examined, it will be noted that its outer and inner circumferential surfaces are skin-like and tend to prevent exuding of juices through the same from the intervening cell structure. When such rings are subdivided circumferentially into segments of desired length (e.g., 3/16 to ⅜ inch), two sides of each piece retain this skin-like surface. This is deemed desirable because such surfaces tend to better retain juices within the pieces and to reduce moisture migration. Also they provide structure to the pieces and tend to prevent mushing under compression. Thus the desired interstices are provided without mushing when the pieces are drawn into the die cavity. Pieces as just described can be obtained by known types of dicing equipment adjusted to chop or cut the onion bulbs in such a manner as to minimize cutting in regions between such surfaces. Some of this equipment operates by slicing the bulbs laterally of their axes to provide slices of desired thickness (e.g., ¼ to ⅜ inch) and then dividing each slice into pieces of the desired size by cross-cutting. Pieces joined along regions of demarcation are readily separated by light attrition (e.g., by tumbling). The bulk of the pieces produced in this manner have one dimension corresponding to the thickness of the enveloping layers of the onion bulb with two-skin like surfaces. A minor number of the pieces may have only one such surface.

Examples of my invention are as follows:

EXAMPLE 1

Raw onions were cut into pieces by use of an Urschel type dicer. The dicer was adjusted to provide pieces about 3/16 inch thick and about ¼ inch in length. The bulk of the pieces were such that each piece had two side surfaces corresponding to the inner and outer surface of a natural onion ring. The die employed was constructed substantially as shown in FIG. 9. The die cavity measured 2 inches in outside diameter and 5/16 inches deep. Thus as measured radially, the cavity was about 5/16 inches in width across the face of the die and the central circular surface 41 measured about 1 inch in diameter. The surface 41 had a narrow rim within which the disk fitted when retracted. A loose mass or layer of onion pieces was deposited upon a supporting surface to provide a layer about 1 inch thick. The die was then pressed down upon the onion bed and suction was applied. At the time the die was applied to the bed, the disk 43 was retracted against the urge of the spring 46. Upon removing the die from the onion bed, it was found that the die cavity was filled with onion pieces that were randomly disposed and in contact with each other with mild compression. The die was then positioned with the cavity uppermost. Suction was discontinued, and a 1.5% aqueous solution of Keltone applied to the exposed onion mass. In applying the solution, the stream was traversed in a circular path over the cavity to obtain relatively good distribution. Some of the solution immediately permeated the interior of the onion mass. To obtain more effective penetration of the Keltone solution a cup was placed over the die and air under pressure applied for a short period, thereby causing some of the gel solution to penetrate downwardly through the onion mass. Also the die was tapped to promote penetration. Following application of the Keltone solution, a 4% aqueous calcium chloride solution was applied in substantially the same manner. The onion mass before applying the solutions weighed 5 grams, and 1.6 grams of the gel solution and 75 grams of the calcium chloride solution were applied. Some excess calcium chloride solution drained through the lower end of the die. A piece of sheet metal (stainless steel) was chilled to a temperature well below 32° F. by contact with dry ice. The die was applied to the chilled sheet and after remaining upon the sheet for about 15 seconds, the die was lifted from the sheet, leaving the mass of onion in ring form. It was observed that the onion mass was frozen in the region of its contact with the chilled plate. It was also noted that the gel formed by the Keltone solution had noticeably hardened through the mass without causing adherence (as by freezing) to the surfaces of the cavity, which was attributed to some lowering of the temperature short of bonding the ring to the contacting side surfaces of the cavity by freezing. The sheet upon which the onion ring was attached was then heated to a temperature above freezing, which served to release the attachment to the sheet. The ring was then scalped from the sheet, further hardened by freezing, and coated with a conventional batter containing cereal flour, egg and milk solids, and finally surfaced with breading (dried bread crumbs). One portion of the onion rings made in this manner was placed in a package and stored at a temperature of 0° F. A second portion was cooked in a deep fat fryer with the oil at a temperature of 380° F. A third portion was placed on a cooky sheet and baked in an oven. It was determined that the rings which had been cooked by deep fat frying or in an oven could be refrozen and subsequently warmed in an oven of the microwave type.

Examination of the onion rings before applying the batter revealed that the onion pieces were bonded together at contacting regions to provide a relatively strong self-supporting ring, and the mass was such that the spaces between the pieces were more or less filled and that the identity of the onion in piece form was clearly evident and dominated the product. It was noted that there was a concentration of hardened gel on one side of the ring which contributed to its structural strength and bonding of the onion pieces together. This was attributed to that part of the gel solution remaining on the upper side of the ring after the solution was applied, and to some compaction in the region being pressed into contact with the chilled surface, which served to spread the gel solution radially and circumferentially to form a visible zone that served to support the remainder of the ring. Further processing, including application of a batter and breading and cooking as by deep fat frying, did not change the identity of the ring structure, except to the extent that some batter penetrated the mass, and the pieces were converted from raw to partially cooked onion. The flavor of all of the products described above in this example was excellent, and no dilution of the desired onion flavor was evident due to the presence of solids derived from the solutions. In contrast to prior onion rings made of small onion particles in a gel matrix, the product had characteristics more comparable to natural onion rings, particularly with respect to intensity of flavor and eating properties, but without the undesirable properties of natural rings, namely variations in size and friability. Also the process makes possible the manufacture of onion rings to a high degree of uniformity with respect to size, shape, dimensions, weight and appearance, and is not restricted to the shape and dimensions of the natural onion rings.

EXAMPLE 2

The procedure was the same as in Example 1. However, a 2% aqueous solution of low methoxyl pectin (Sunkist Brand Exchange No. 3477) was used in place of the Keltone solution. At the time this solution was applied, it was at a temperature of about 70° F. A 4% aqueous calcium chloride solution was used to accelerate gel formation. The results obtained were substantially the same as in Example 1.

EXAMPLE 3

The procedure was the same as in Example 2. However, in preparing a low methoxyl pectin solution, 25% of corn syrup was added, and citric acid was added to provide a pH of about 3. It was noted that the acid and sugar solution served to somewhat modify the viscosity, flavor and eating properties.

EXAMPLE 4

The procedure of Example 1 was repeated, using source materials other than onion. Particularly, products were made using precooked corn niblets, precooked and drained blueberries, diced smoked ham, baby shrimp, subdivided pieces of shrimp meat and mincemeat.

EXAMPLE 5

The procedure was generally the same as in Example 1. However, instead of using both gel and setting solutions, the solution employed contained 8 grams of agar-agar in 200 grams of water. About 3 grams of this solution was applied to the exposed surfaces of the onion ring with the solution at a temperature of about 120° F. Upon applying the die to the chilled surface, it was noted that setting of the solution was accelerated, although more time was required than with the solutions specified in Example 1. However, after setting with attachment to the chilled sheet, it was possible to remove the ring in the same manner as described in Example 1. It was found that such a ring could be processed in the same manner described in Example 1.

EXAMPLE 6

Onion rings were made as described in Example 1. However, instead of applying the batter to all exterior surfaces, it was applied as shown in FIG. 13, leaving onion pieces largely exposed on one side. Such rings were cooked by deep fat frying. Cooking left the coating intact, with the exposed onion pieces somewhat browned, but without burning. Such rings were attractive in appearance and were characterized by an onion flavor that was somewhat stronger than the completely coated rings.

What is claimed is:

1. In a method for producing molded forms from moist edible material, the steps of applying a die having a mold cavity to a layer or bed of pieces of the material, the mold cavity having its open side faced toward the bed, applying pneumatic suction to the die cavity while it is so applied whereby pieces are drawn into the cavity to fill the same, removing the die from the bed with the pieces within the cavity, applying a solution of a binding agent to the pieces while in the cavity, applying the open side of the die cavity and the corresponding side of the mass of material within the cavity to a surface that is at a temperature level below that of the material in the cavity, whereby the material is chilled and caused to adhere to the surface, removing the mold from the chilled surface whereby the molded form of the material is left adhering to the chilled surface, and elevating the temperature of the chilled surface to release the molded form from the surface and then removing the molded form from the same.

2. A method as in claim 1 in which the pieces of the material are of such size and structure that the mass of the same within the die cavity and before applying the bonding solution is pervious to the passage of air.

3. A method as in claim 1 in which the chilled surface is at a temperature below 32° F.

4. A method as in claim 1 in which a setting agent is supplied to the binding solution to promote adherence of the pieces together.

5. A method as in claim 1 in which the solution contains a gel forming material.

6. A method as in claim 1 in which the pieces of material consist of moist onion derived from onion bulbs, each piece having two skin-like surfaces corresponding to the regions of demarcation between the natural enveloping layers of the bulb from which it is derived, and in which the pieces retain their physical identity during the method.

7. A method as in claim 1 in which the amount of added binding agent is such that the pieces are the major part of the mass and dominate the same.

8. A method as in claim 4 in which the binding agent consists of a solution of a material selected from the group consisting of calcium sensitive methoxyl pectin, calcium-sensitive alginates, or combinations thereof, and in which the setting agent is a solution of a divalent metal salt.

9. A method as in claim 4 in which the binding agent is an alginate which sets upon contact with calcium ion, and in which the setting agent is a solution of a calcium salt.

10. A method as in claim 1 in which the binding agent contains a gel forming material.

11. A method as in claim 10 in which the binding agent is so applied as to provide a substantially continuous layer of the same on one side of the molded form.

12. A method as in claim 1 in which after removal of the molded form from the surface it is frozen to form a marketable product.

13. A method as in claim 1 in which the product after removal from the surface is frozen and thereafter coated with an edible batter.

14. A method as in claim 13 in which the coated product is subjected to deep fat frying.

15. A method as in claim 1 in which the molded form is frozen and coated with an edible batter, the coating being applied in such a manner as to leave certain surface areas in the form uncoated and exposed.

16. An edible product comprising a molded form consisting of randomly disposed elongated pieces of moist onion derived from onion bulbs, the bulk of the pieces having two skin-like side surfaces corresponding to the regions of demarcation between the enveloping layers of the bulbs, the pieces being bonded together in contacting regions by an edible gel-type binder, the binder forming a substantially continuously layer only on one side of the form in which some of the pieces of onion are embedded, the separate identity of the pieces being visually evident as viewed from the other side of the form.

17. A product as in claim 16 in which the molded form has a batter on some of the exterior surfaces of the same, the remaining exterior surfaces of the form being uncoated and exposed.

18. A product as in claim 16 in which the molded form is ring-shaped, the continuous layer forming one side of the ring.

19. An edible product resulting from the method of claim 13 and in which the pieces of material consist of elongated pieces of moist onion derived from onion bulbs.

20. A method for the manufacture of food products of predetermined configuration from pieces of edible material, progressing a series of dies through successive processing steps, each die having a die cavity shaped according to the desired configuration of the product, applying each die at a die filling station to a loose mass of the edible pieces, applying suction to each die in said filling station to cause the edible pieces to be drawn into the cavity of the same, subsequently at a succeeding station introducing a gel forming solution into the material within the cavity, subsequently causing each die to be contacted with a chilled surface to cause adherence of the material in the die cavity to said surface, thereafter removing each die from the chilled surface leaving the mass of material adhered thereto, and then elevating the temperature of the chilled surface to release the formed mass of material therefrom.

21. A method as in claim 20 in which each die is applied to said material at said die filling station with its cavity faced downwardly and is thereafter inverted with the die cavity faced upwardly prior to progressing the said die to said subsequent operations.

22. A method as in claim 20 in which immediately following introduction of the gel forming solution a gel setting solution is applied to the material in the cavity.

23. Apparatus for the manufacture of food products from moist pieces of edible material, means for carrying a series of dies through successive processing stations, each die having a die cavity shaped according to the desired configuration of the products, means at a filling station for applying each die to a bed or layer of the edible pieces, means for applying suction to each die cavity while the die is faced downwardly and applied to the bed or layer to thereby cause pieces of the material to be drawn into the cavity to fill the same, means at a succeeding station for applying a gel forming solution to the material within the cavity while the cavity is faced upwardly, means at a station successive to the last-mentioned station for contacting the die and the material within the die cavity with a chilled surface to cause adherence of the material in the die cavity to said chilled surface, means operating subsequent to initial contact with the chilled surface for removing the die from the chilled surface and from the formed mass of material adhered thereto, and means for elevating the temperature of the chilled surface to release the formed mass of material from the same.

24. Apparatus as in claim 23 in which the dies are carried by an endless belt and in which the chilled surface is a portion of a second belt driven to move synchronously with the first-named belt.

25. Apparatus for the manufacture of food products from pieces of edible material, a horizontally running endless belt having end loops, a series of dies secured to the belt, each die having a die cavity faced outwardly from the belt, a second endless belt overlying the first belt, the lower run of the second belt being disposed in spaced parallel relationship with a portion of the upper run of the first-named belt, means for driving both of the belts whereby the spaced parallel portions of the same move in synchronism, means adjacent one end loop of the first belt for applying each die while inverted to a bed of food pieces, means for applying suction to the cavity of each die while the same is being applied to said bed whereby pieces of edible material are drawn into the cavity to fill the same, each die being inverted as it is moved to the upper run of the first-named belt, means for applying a gel forming solution to the material within each die while the same is on the upper run of the first-named belt, means for chilling the lower run of the second-named belt, the spacing between the parallel portions of the first and second belts being such that as each die progresses between the belts the upper face of each die and the material within the die is caused to contact the lower run of the second named belt, means for chilling a portion of the lower run of the second named belt to cause adherence thereto of the material within the die cavities further progression of the first belt causing the formed mass of material within each die cavity to remain adhered to the second-named belt whereby it is removed from the associated die, and means for elevating the temperature of a portion of the second belt to release the formed masses therefrom.

26. In apparatus for the manufacture of food products having a predetermined configuration, a die body having an open recess in one end face of the same, means for applying suction to the interior of the recess, said end face including an end surface surrounding the recess and another surface surrounded by the recess, and retractable means carried by the body adjacent said other surface, said retractable means comprising a disklike member disposed parallel to said end face, the disklike member having a perimeter configuration corresponding to that of said other surface, and means serving to mount the disk for movement of the same between first and second positions, the first position being spaced away from said other surface and parallel to the same, and the second position being in juxtaposition with said other surface.

27. Apparatus as in claim 26 in which spring means is provided for yieldably urging the disk toward said second position.

28. Apparatus as in claim 26 in which means is provided to prevent pneumatic suction between the disk and the body.

29. Apparatus as in claim 27 in which the plane of said another surface is parallel to the plane of the first named end surface and inset from the same by an amount substantially equal to the thickness of the disk-like member.

30. Apparatus as in claim 25 together with means for removing any remaining material from the die cavities after the formed mass has been removed.

31. An onion ring food product comprising moist onion pieces derived from the enveloping layers of onion bulbs, the pieces being aggregated in the form of a ring in which the pieces are adhered together on areas of mutual contact by an edible binding agent, the binding agent forming a continuous annular layer on one side of the ring, with some of the pieces embedded therein, and an edible batter coating on exterior surfaces of the annular layer and extending over the inner and outer circumferential surfaces of the ring, the coating terminating short of extending over the other side of the ring whereby the other side is largely uncoated and exposed.

32. An edible product resulting from the method of claim 13.

33. An edible product resulting from the method of claim 15.

* * * * *